April 27, 1943.  W. C. BARNES ET AL  2,317,720
METHOD AND APPARATUS FOR DETECTING FLAWS IN MAGNETIZABLE BODIES
Filed April 17, 1940  7 Sheets-Sheet 2

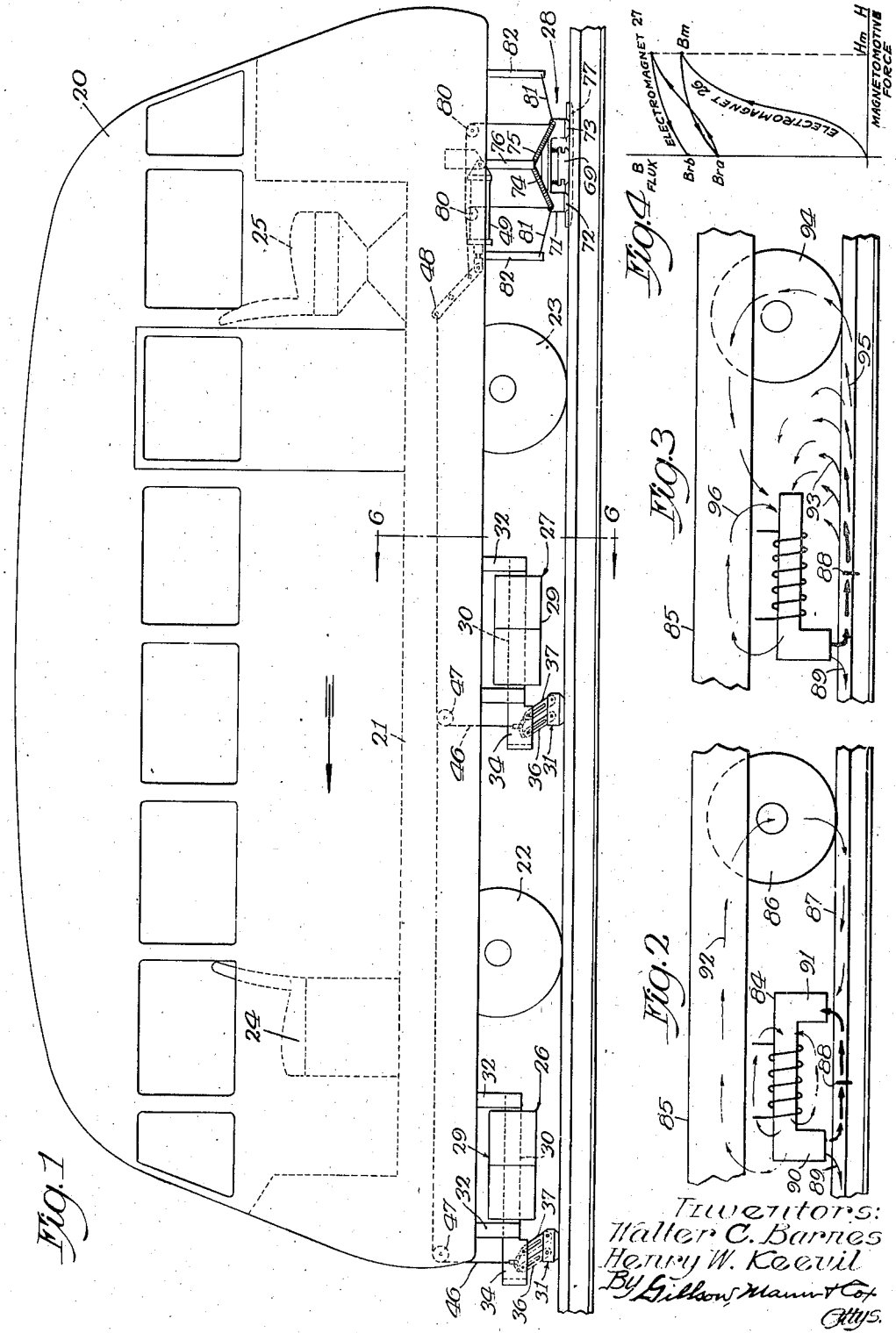

Inventors:
Walter C. Barnes
Henry W. Keevil
By Gilson, Maunt &c.
Attys.

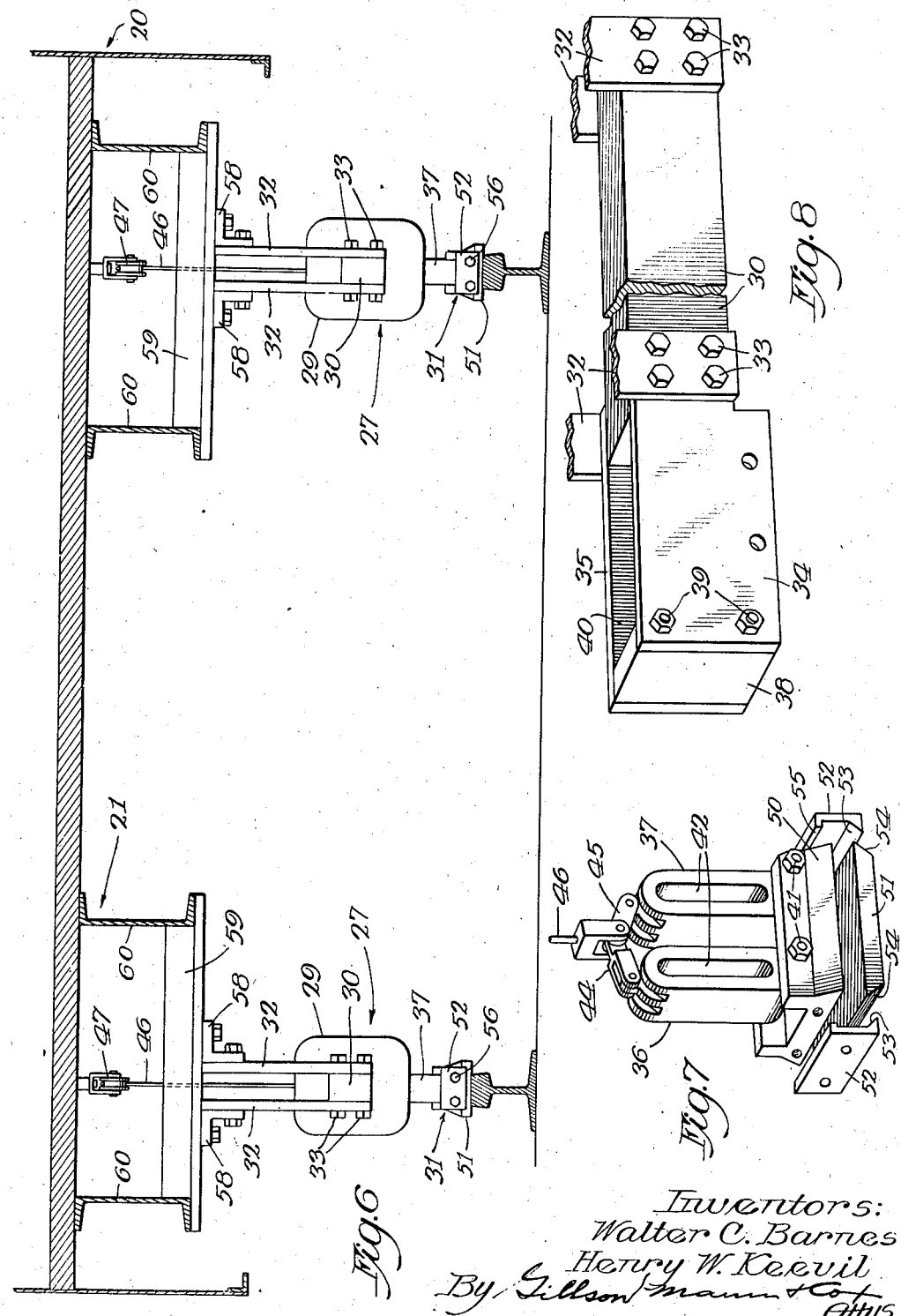

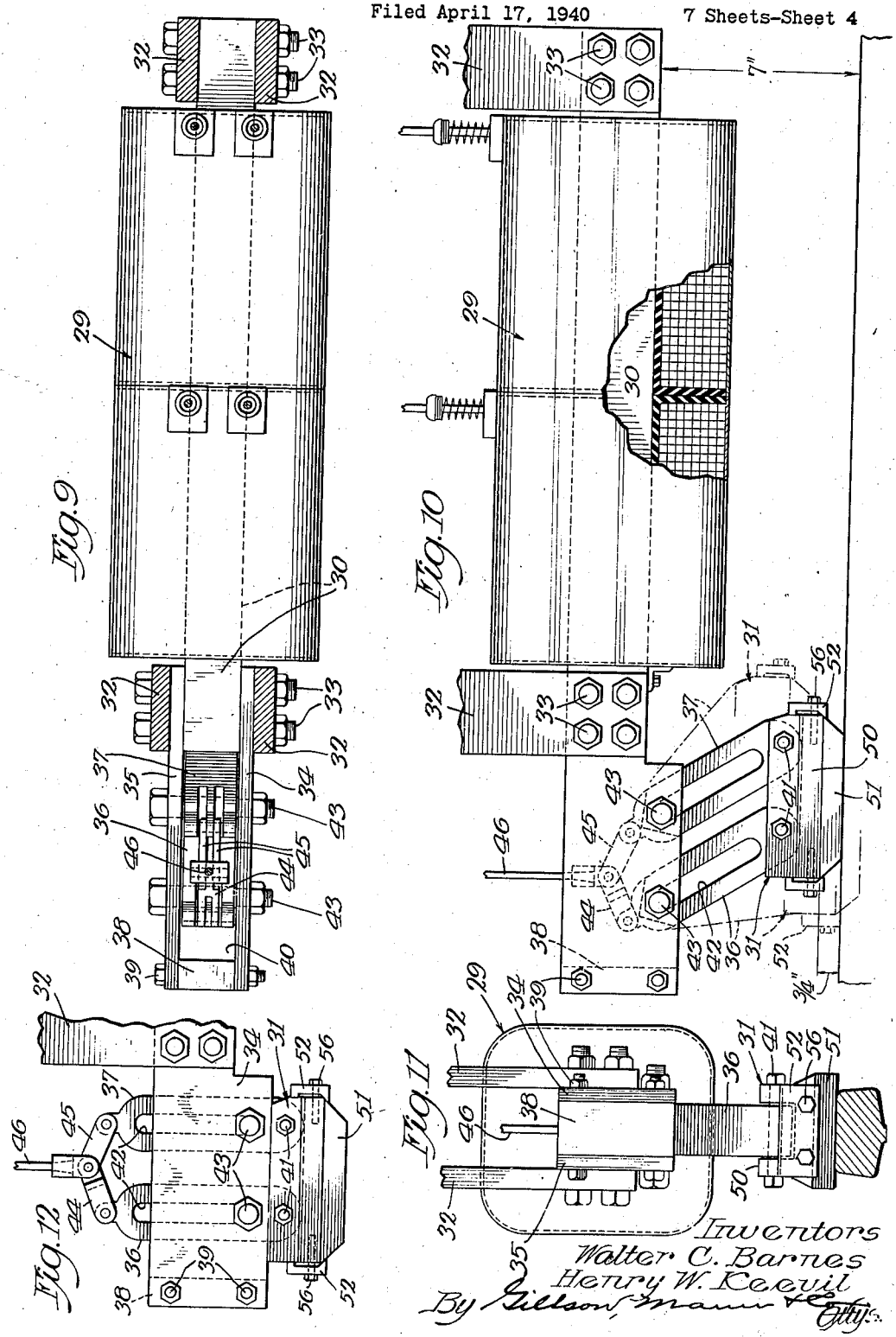

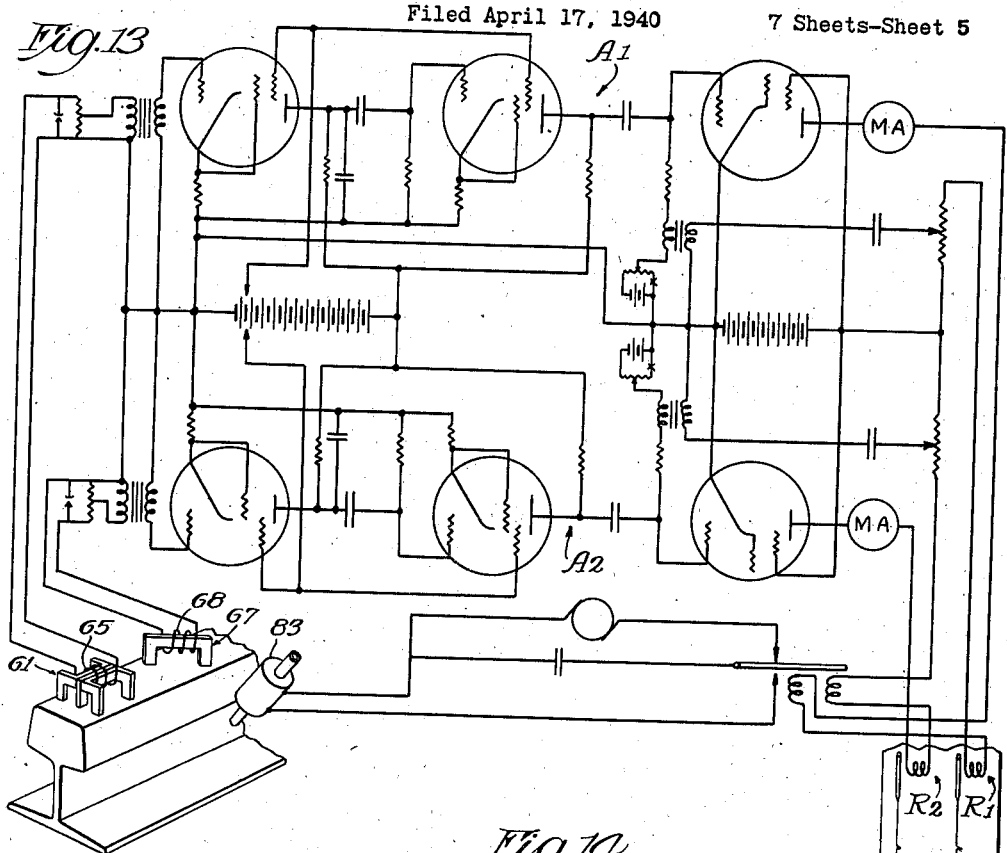
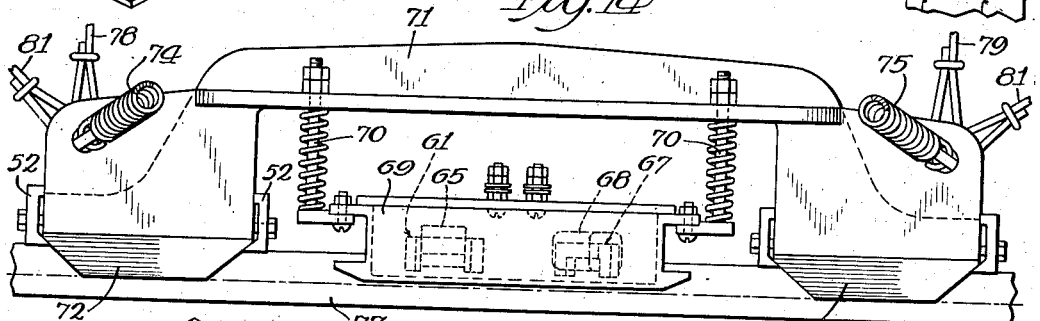
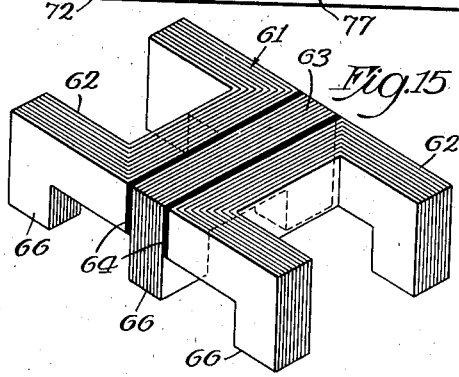
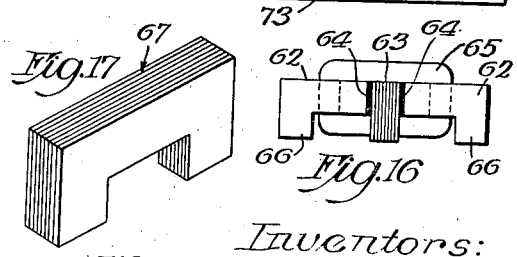
Inventors:
Walter C. Barnes
Henry W. Keevil April 27, 1943.  W. C. BARNES ET AL  2,317,720
METHOD AND APPARATUS FOR DETECTING FLAWS IN MAGNETIZABLE BODIES
Filed April 17, 1940  7 Sheets-Sheet 6
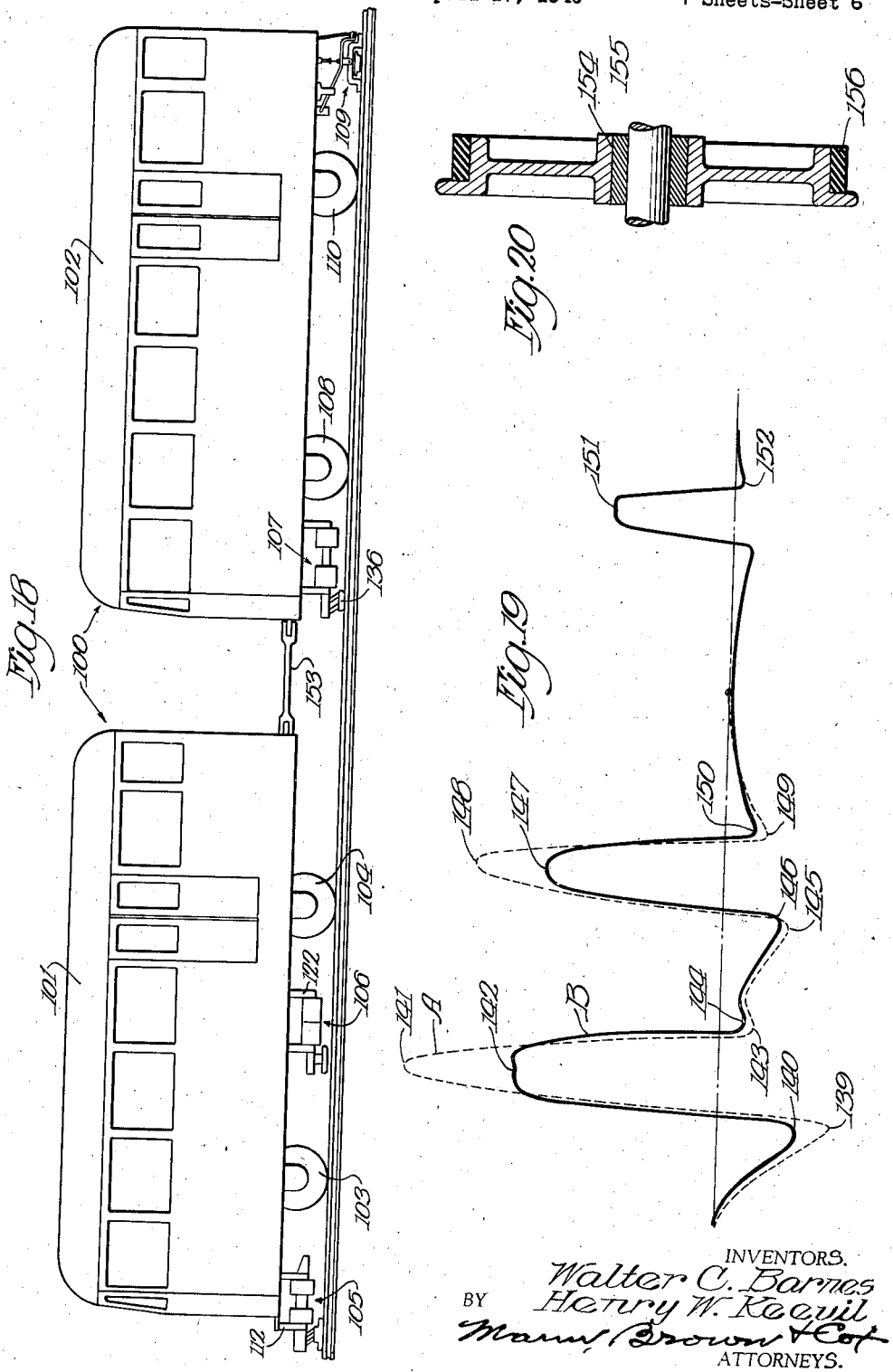
INVENTORS.
Walter C. Barnes
Henry W. Keevil
BY
Marus, Brown & Co.
ATTORNEYS.

April 27, 1943.  W. C. BARNES ET AL  2,317,720
METHOD AND APPARATUS FOR DETECTING FLAWS IN MAGNETIZABLE BODIES
Filed April 17, 1940  7 Sheets-Sheet 7
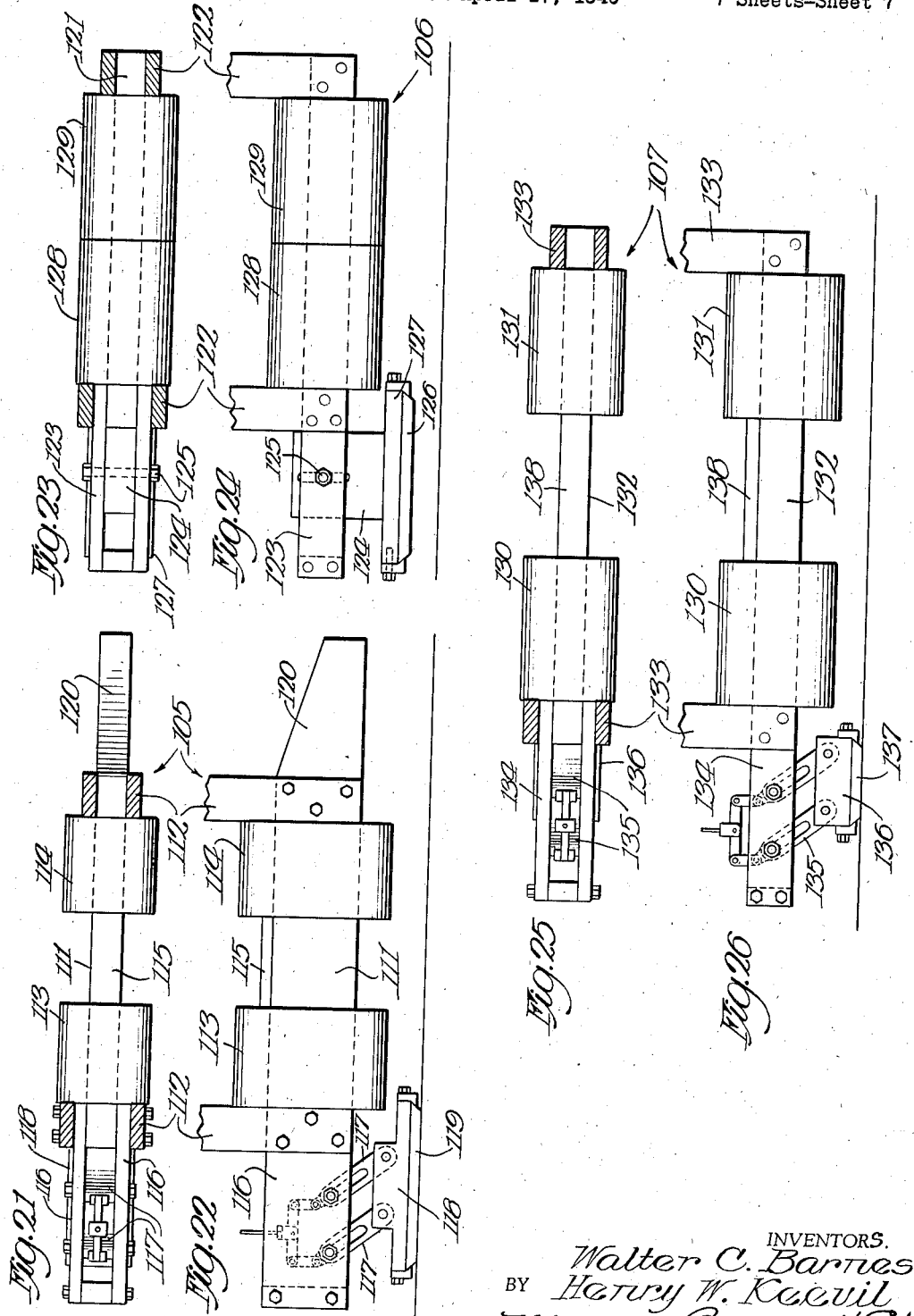
INVENTORS.
Walter C. Barnes
Henry W. Keevil
BY
ATTORNEYS.

Patented Apr. 27, 1943

2,317,720

UNITED STATES PATENT OFFICE

2,317,720

METHOD AND APPARATUS FOR DETECTING FLAWS IN MAGNETIZABLE BODIES

Walter C. Barnes, Lake Bluff, and Henry W. Keevil, Highland Park, Ill.

Application April 17, 1940, Serial No. 330,209

22 Claims. (Cl. 175—183)

In our application filed June 8, 1935, bearing Ser. No. 25,586, we described a method and apparatus for detecting flaws in magnetizable bodies which differed from the commonly known electrical and magnetic flaw detection practices, both in principle and result. The present application relates to important improvements on the method and apparatus therein disclosed, and is a continuation in part of our application filed May 14, 1937, Ser. No. 142,562, and also of our application filed June 6, 1938, Ser. No. 212,121 on which the basic patent on the common subject matter is to issue.

The early experimental work on this subject was done on a specially laid section of track known as a "test track" which is made up of rails known to contain defects of various kinds. The track was hand-tested by the well known electrical drop in potential method and the location, size and type of fissure were carefully marked on the rail opposite each fissure in so far as that information was made available by the hand check method, by visual inspection, or by other means. The test track, therefore, provided a standard by which to gauge the effectiveness of various kinds of flaw detecting apparatus and various adjustments for each kind.

When the method and apparatus disclosed in our earlier application, Ser. No. 25,586 was tried out on the track, it was found, after the apparatus had been properly adjusted, that the fissures were accurately located and that surface defects of the kind which do not affect the wearing qualities and safety of the rail had little or no effect on the apparatus. But when the car was taken out on the right of way for further testing, it was discovered that some fissures were being missed even though the car had proven itself to be almost 100% efficient on the test track.

It was only after a great deal of experimentation and numerous disappointing efforts that the solution was found in the method and apparatus of this application and of application Ser. No. 212,121.

Broadly, the object of the invention is to perfect the method and apparatus disclosed in our earlier application; to make it more accurate and reliable under all testing conditions; and to accomplish all of this with the simplest, least expensive and most foolproof apparatus possible.

In addition, it is our object to improve equipment mounting, to simplify structure, to increase the sensitivity and effectiveness of the detecting apparatus, and to improve the method of establishing residual magnetism in the rail.

The present application relates to various improvements and modifications covered broadly but not specifically in the basic application, Ser. No. 212,121.

Further objects and advantages will become apparent as the disclosure proceeds and the description is read in conjunction with the accompanying drawings, in which Fig. 1 is a side elevational view, although somewhat diagrammatic, of a rail motor car equipped with this invention;

Figs. 2, 3 and 4 are diagrams that will be used in explaining some of the theory which is believed to underlie the invention;

Fig. 6 is a transverse, sectional view through the underframe of the car, the section being taken on the line 6—6 of Fig. 1;

Fig. 7 is a perspective view showing the retractible magnet shoe;

Fig. 8 is a perspective view showing the horizontal portion of the magnet core;

Figure 5:
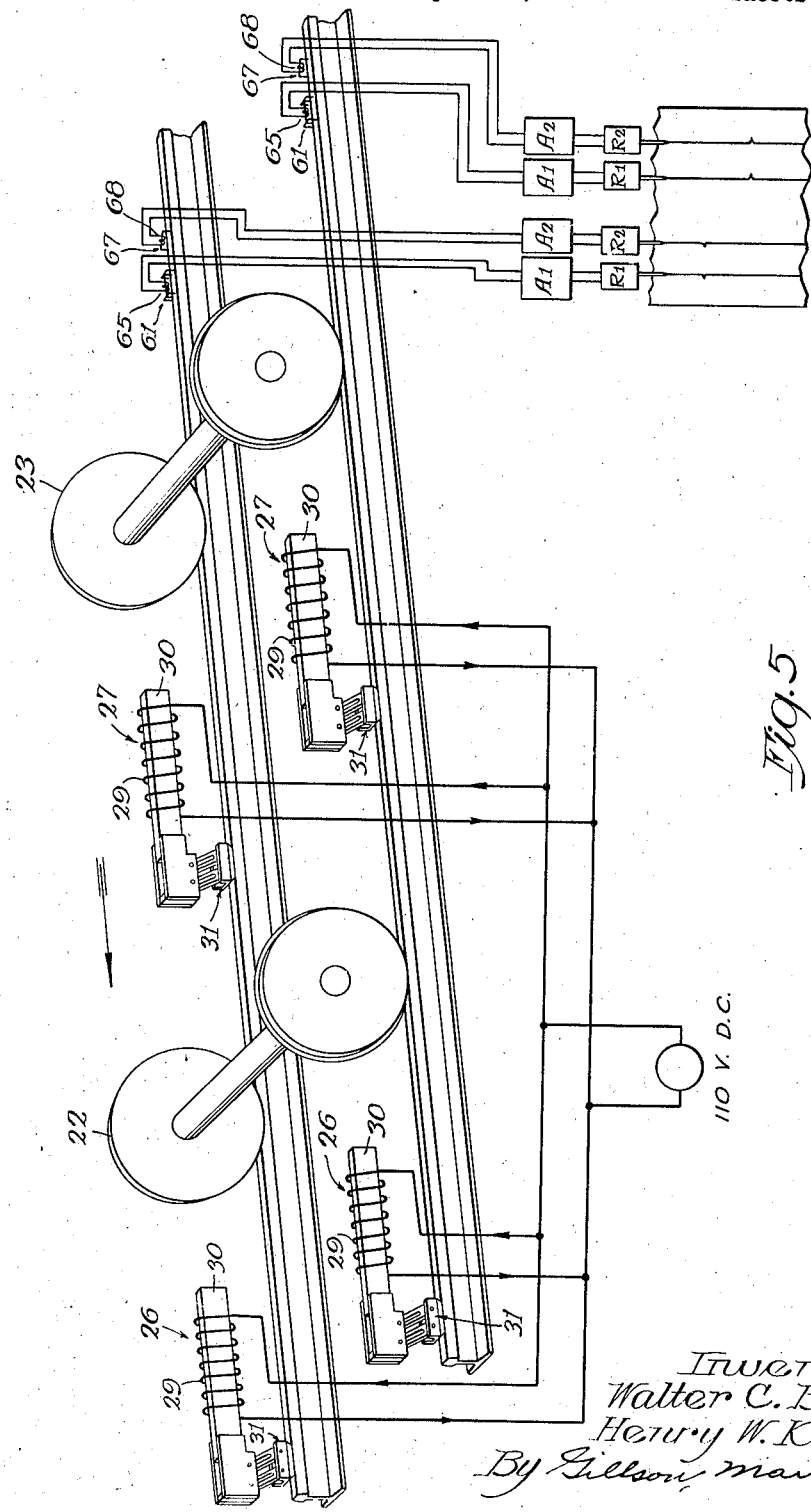
Fig. 5 is a diagrammatic, perspective view showing the relationship between the electromagnets, the wheels and the detecting apparatus.

Figs. 9, 10, and 11 are plan, side elevational and end elevational views, respectively, of one of the electromagnets;

Fig. 12 is a fragmentary, side elevational view showing the magnet shoe in retracted position;

Fig. 13 is a diagram of the electrical circuit preferably used with the detecting and recording apparatus;

Fig. 14 is a side elevational view of the detector carriage or pickup;

Fig. 15 is a perspective view of the core used with one of the detector coils;

Fig. 16 is an end elevational view of the same showing the coil in place;

Fig. 17 shows another form of core which may be used;

Fig. 18 shows an improved form of detector car in which two rail energizing magnets are mounted on the leading section of the car and a third rail energizing device is mounted on the trailing section of the car;

Fig. 19 is a diagrammatic graph showing the improved results that are obtained with the car shown in Fig. 18;

Fig. 20 is a sectional view through one of the front wheels of the trailer section, the wheel preferably being made of manganese steel and having its tread covered with a resilient cushion;

Figs. 21 and 22 are top and side elevational views respectively of the first magnet;

Figs. 23 and 24 are corresponding views respectively of the second magnet; and

Figs. 25 and 26 are corresponding views respectively of the third magnet.

Explanations will be found throughout this specification of some of the theory which is believed to underlie the invention, but the disclosure and appended claims are not to be construed as dependent upon the truth or falsity in fact of the expounded theory for the method and apparatus disclosed herein have been proved to be highly successful in accomplishing their intended object, and the best mode of utilizing the method and apparatus is disclosed herein in conformity with Sec. 4888 of the Revised Statutes. Furthermore, limitations should not be read into the appended claims by reason of the specific disclosure unless required by the prior art.

One outstanding advantage of the method and apparatus of this invention is that it may be embodied in a rail car of modest size, such for example as the car shown in Fig. 1. The car comprises a house body 20 mounted on an underframe 21 which in turn is supported on front and rear wheels 22 and 23, respectively. It is of some importance that the wheels be of magnetic material, as is usual.

The car is normally driven in the direction indicated by the arrow in Fig. 1 with the driver sitting at 24 and the engineer in charge of tests sitting at 25. Since the controls form no part of the present invention, none will be described.

The principle of flaw detection which is described and claimed broadly in our earlier application, Ser. No. 25,586 consists in introducing a strong magnetic flux into the rail or other magnetizable body to be tested, and after removing the energizing flux, then testing the body for traces of residual magnetism. In the present invention, two magnets rather than one are used for introducing the flux into the rail, but their conjoint use is more than mere duplication of magnets for they must be used together in a certain way if their conjoint use is to effect the useful objects of this invention.

Each side of the car is equipped with a forward electromagnet 26 and a rear electromagnet 27, the former preferably being in advance of the wheel 22 and the latter preferably being intermediate the wheels 22 and 23. Following the wheel 23 is a detector generally designated 28, and since the magnets 26 and 27, together with the detector 28 are identical with the corresponding magnets and detector on the other side of the car, only one set will be described.

The magnets 26 and 27 are also identical, and the details of their construction are shown in Figs. 9–12 inclusive. Each comprises a coil 29 preferably made in two parts to facilitate handling and replacement, and a core 30 which is provided at its forward end with a retracible pole 31 in the form of a shoe which may be lifted from the position shown in Fig. 10 (the service position) to the position shown in Fig. 12 (light running position).

The electromagnet is supported from the car underframe by non-magnetic bars 32 preferably of stainless steel. The support bars 32 are secured to the horizontal portion 30 of the core by a plurality of bolts 33, those at the forward end of the core serving the additional function of clamping pole plates 34 and 35 to the core. These two plates together with links 36 and 37 and the magnet shoe 31 constitute an extension of the core, and all are made of annealed mild steel, or equivalent magnetic material.

The forward ends of the plates 34 and 35 are held apart by a spacer 38 through which bolts 39 pass so that an opening 40 is provided within which the links 36 and 37 may operate. The links are pivotally connected at their lower ends to the magnet shoe, as indicated at 41, and each has a slot 42 through which a guide bolt 43 passes. The upper ends of the links are connected by a clevis 44 and links 45 to a lifting cable 46 which, as shown in Fig. 1, passes over a pulley 47 and is connected to the resistance end of a lever 48 which is operated by an air cylinder 49 through suitable controls.

The magnet shoe is best shown in Fig. 7 and it comprises a block 50 of mild steel to the base of which a stainless steel runner 51 is secured by clamping plates 52. The plates 52 are provided with a bevelled edge 53 adapted to engage a similarly bevelled edge 54 of the runner 51, and a flange 55 provided along the upper margin of the plates 52 acts as a fulcrum about which the plates revolve when securing bolts 56 are screwed into the block 50. Whenever a runner requires replacement due to wear, it is only a matter of a few minutes to make the replacement due to the ease with which the plates 52 may be removed from the block 50.

While the maintenance of a uniform air gap between the forward end of the core of the electromagnet and the rail is not of vital importance, it is obvious that there is some advantage in having an air gap at the forward end of the magnet and in maintaining it substantially constant. Tests have shown that the distance between the rail and the car underframe may vary as much as an inch or more, and by maintaining a uniform air gap between the magnet shoe 31 and the rail, the energizing flux that is sent through the rail as the car passes on is kept substantially constant with a consequent more uniform result in the action of the detecting apparatus.

Furthermore, the vertically reciprocable magnet shoe 31 obviates any possibility of mechanical injury to the apparatus because of differences in the elevation of the rails.

The non-magnetic shoe runner being made of stainless steel, manganese steel, or other non-magnetic wear-resistance material, is capable of standing up under service conditions in spite of the magnetic force which produces a pressure contact between the rail and the runner. The magnet shoe with its runner is made sufficiently wide so that it always maintains its proper position on the rail even when the car is rounding curves, or when there is lateral sway of the car.

In normal operation, the shoe 31 rides on the top surface of the rail and accommodates itself to the unevenness in the rail surface, as shown by the dotted lines in Fig. 10. When the car is not being used for testing, but is traveling from one place to another at comparatively high speeds, the retractible shoe 31 is lifted to the position shown in Fig. 12 by admitting air to the air cylinder 49.

In practice, it has been found satisfactory to energize the coils 29 from 110 volt D. C. source of electromotive force, and to provide approximately 21,000 ampere turns on each coil (i. e. per electromagnet). The core 30 preferably has a cross sectional area of approximately six square inches, and the pole plates 34 and 35, links 36 and 37 and shoe 31 preferably have such shape and size that the energizing flux traveling through the iron circuit always has not less than six square inches of cross sectional area through which to pass. It should be understood, of course, that the mention of six square inches for the magnetic circuit is merely illustrative and that the figure may vary as service conditions demand.

Also, by way of illustration, the non-magnetic shoe runner 51 may be approximately three-fourths of an inch in thickness (which effects a magnetic air gap of that amount at the forward end of the electromagnet) and the rear end of the core 30 may be approximately seven inches from the top of the rail; and at the other end of the magnet, there may be an air gap of approximately seven inches between the rail and the end of the core 30.

The support bars 32 are preferably carried on the car underframe by angle brackets 58 secured to cross angles 59 extending between longitudinal sills 60 of which there are two on each side of the car.

The detecting apparatus 28 used to indicate residual magnetism left in the rail, together with its mounting and the electrical circuit which connects it with the recording apparatus, is shown in Figs. 1, 5 and 13-17 inclusive, but since none of this apparatus is claimed per se in this application, the description of it will be limited to that which is necessary for showing the operativeness and useful combination of detecting apparatus with means for setting up residual magnetism in the rail.

Although a single detecting coil per rail has been found satisfactory, two have been shown in the drawings. By using different types of detecting coils in combination, the possibility of missing certain types of fissures is lessened. The preferred form of detecting coil is one having a core 61 which is H-shaped in plan and E-shaped when viewed from right elevation (Fig. 15). The core is made up of a plurality of laminations divided into three groups, two of which 62, are U-shaped in plan and L-shaped in end elevation, and the third of which 63 is bar-shaped in plan and U-shaped in side elevation. Sheets of insulating material 64 may be interposed between the three groups if desired.

The coil 65 used with the core 61 is somewhat flat, as shown in Fig. 16 so that the feet 66 of the core project below the bottom of the coil.

The core 67 shown with the second coil 68 may be identical with the middle section 63 of the core 61, but it is preferably placed at an angle with respect to the longitudinal axis of the rail.

Both coils, with their cores, are mounted in a box 69 adjustably supported, both laterally and vertically, by bolts 70 from a detector carriage 71 having front and rear runners 72 and 73, respectively, which may be of stainless steel, manganese steel or other non-magnetic material, and which are held in place by the same type of clamping plate 52 which is used for holding the non-magnetic runner on the retractible magnet shoe 31. Springs 74 and 75, secured at one end to a bracket 76, which projects downwardly from the car underframe outside of the gauge line of the track and at the other end to the detector carriage 71, hold the carriage in proper lateral position with respect to the rail against an elongated guide runner 77 secured to the carriage.

The carriage 71 is moved from service position to light running position by cables 78 and 79 which pass over pulleys 80 and are secured to the power end of the lever 48 so that the air cylinder 49 controls the lowering and raising of the detector carriage. The pulleys 80 are placed slightly inside of the gauge line of the track, and the springs 74 and 75 do not come into operation until after the guide runner 77 has dropped inside the gauge edge of the rail.

The detector carriage is moved longitudinally of the rail by traction cables 81 which are firmly anchored to depending bars 82.

The electrical diagram shown in Fig. 13 shows a preferred hookup between the detecting coils 65 and 68, amplifiers A1 and A2, recorders R1 and R2 and a paint gun 83. The amplifiers A1 and A2 while using common leads in a number of instances are functionally separate, the former serving to amplify impulses received by the coil 65 and to actuate the recorder R1 and paint gun 83, and the latter serving to amplify impulses received by the coil 68 and actuate recorder R2 and paint gun 83.

The detecting apparatus shown in Figs. 13 to 17 is merely illustrative of many forms of detecting apparatus which may be employed for locating residual magnetism in the rail, and while there are novel features in the apparatus shown which will be covered by a separate application, or applications, the general nature of the detecting apparatus may be readily understood by those skilled in the art.

The more important problem with which this invention is concerned is that of establishing residual magnetism at, or polarizing the faces of fissures in, the rail, and Figs. 2, 3 and 4 will be used to explain what is believed to be a basis for the greatly improved results which are obtained when the apparatus disclosed and claimed herein was used.

In Fig. 2, there is shown a diagram of what may be regarded as the probable distribution of magnetic flux when a U-shaped electromagnet is used. The relative concentration of flux is indicated to some extent by the lightness or heaviness of the arrows.

The magnet is indicated at 84, the car underframe at 85, the car wheel at 86, the rail under test at 87 and a transverse fissure at 88.

For convenience of terminology, a flux which directly opposes the ultimate direction of magnetism which is to be left in the fissure as residual magnetism will be termed "reversed flux;" a flux which is at right angles to the ultimate direction of flux will be termed a "demagnetizing flux;" and a flux which tends to build up the ultimate residual magnetism will be termed a "magnetizing flux."

With the above terminology in mind, the following presumably takes place when the U-shaped magnet shown in Fig. 2 traverses the fissure 88.

1. The forwardly directed stray field 89 sends a weak reversed flux through the fissure.
2. The main body of flux flowing from the forward pole 90 of the magnet into the rail sends a strong demagnetizing flux through the fissure.
3. The main body of flux in traveling through the rail from the pole 90 to the pole 91 sends a strong magnetizing flux through the fissure.
4. The main body of flux in leaving the rail to enter the pole 91 sends a strong demagnetizing flux through the fissure.
5. The stray field indicated at 92 which travels along the underframe through the wheel 86 and forwardly along the rail 87 sends a weak reversed flux through the fissure.

Now, by comparison, let us see what presumably takes place when a magnet of the form disclosed and claimed herein is used in place of a U-shaped magnet (see Fig. 3):

1. The weak reversed flux 89 exists as before.
2. The strong demagnetizing flux caused by the main body of flux entering the rail immediately over the fissure is also still present.
3. The strong magnetizing flux caused by the main body of flux traveling rearwardly through the rail exists as before, and while it is not as strong because of the greater air gap in the magnetic circuits, its net effect is infinitely greater due to substantial elimination of the subsequent demagnetizing flux, as explained in paragraph 4 below.
4. Since the pole 91 has been eliminated, there is no strong demagnetizing flux caused by the main body of flux leaving the rail, but instead, there is a comparatively weak, vertical, demagnetizing flux 93 which is distributed for a considerable distance beyond the magnet. Obviously, if the wheel 94 is too close to the magnet, it will tend to increase the vertical, demagnetizing flux, and hence is to be avoided. Furthermore, the weak vertical field in combination with the gradual manner in which the field leaves the rail reduces the possibility of false indications due to surface conditions such as corrugations, burns and the like.
5. The stray flux 95 which travels rearwardly through the rail and possibly through the wheel 94 tends to crowd the stray flux 96 back into the core and hence reduces the reversed flux through the rail in rear of the magnet.

From the above, it is quite clear that the L-shaped magnet, or magnet of equivalent shape, of this invention is greatly superior to a U-shaped magnet and tests have borne out that fact.

In addition, the use of two magnets in place of one produces a new and unexpected result. The result is unexpected for one reason because increasing the size and capacity of a single magnet will not give the desired results, and furthermore, because the magnets must be either spaced apart a sufficient distance so that there will be no interlinkage of flux, or a magnetic shield must be provided. For example, two L-shaped magnets placed between the wheels 22 and 23 of the car shown in Fig. 1 are substantially no better than a single L-shaped magnet, although a single L-shaped magnet is infinitely better than a U-shaped magnet.

A possible explanation of this phenomenon is shown in Fig. 4. Although no verification of this curve has as yet been obtained, the ultimate result of increased residual magnetism has been definitely established.

In Fig. 4, the most plausible explanation of the phenomenon which we have been able to deduce is shown using that portion of the hysteresis loop which seems to apply to the conditions which exist in our arrangement. Starting with zero flux B and zero magnetomotive force of $H_m$ to the body under test, the flux in the body reaches a maximum at $B_m$ and then falls to $B_{ra}$ as the magnet moves over the portion of the rail under test. The character of the moving magnet would seem to insure that there is no countermagnetomotive force applied to the rail.

Although Spooner in "Properties and Testing of Magnetic Materials," published by McGraw-Hill Company of New York, 1927, indicates at pages 362 and 363 that under somewhat similar circumstances, a second application of positive magnetomotive force will bring the residual magnetism down to the same point $B_{ra}$ after the second magnetomotive force has been removed, our experience has shown that the residual magnetism does not fall back to $B_{ra}$, but instead falls back to a higher value such as $B_{rb}$, and it may be that the mechanical shock that is delivered to the rail by the wheel interposed between the two magnets may have some effect in producing this result. The fact is that the residual magnetism is greater when the method and apparatus of this invention is used than when a single magnet is used, and the above may possibly explain the reason for this phenomenon.

The method which we use may be described as successively subjecting the body under test to an energizing flux, substantially removing the energizing flux, subjecting it to another energizing flux, substantially removing the second energizing flux and then testing the body for residual magnetism, or viewed from a slightly different angle, the method consists in subjecting the body under test to a varying magnetic flux having at least two high intensity periods interspersed with a relatively low intensity period, and then testing for residual magnetism.

In the improved form of the invention shown in Fig. 18, the detector car, generally designated 100, comprises a leading section 101 and a trailing section 102, the former carrying the power equipment for operating the car and the latter carrying the equipment for recording the flaw indications received by the detecting equipment.

The leading section has front wheels 103 and rear wheels 104, and an electromagnet 105 is mounted at the front of the car in advance of the wheels 103. A second electromagnet 106 is mounted between the front and rear wheels 103 and 104, and a third electromagnet 107 is mounted at the front of the trailer section 102 in advance of the front wheels 108. A detector unit 109 is mounted at the rear of the trailer section behind the rear wheels 110.

The first magnet 105 is best shown in Figs. 21 and 22, and preferably it comprises a core 111, suspended by non-magnetic brackets 112 from the car body. A pair of coils 113 and 114 are mounted on the core and are held in spaced relation by a block 115 or equivalent means secured to the core 111. The core is extended at its front end, as indicated at 116, to receive links 117 which support a pole piece 118, to the bottom of which is detachably secured a cast iron wear shoe 119. The core 111, extension 116, links 117, pole piece 118, and shoe 119 are all made of magnetic material so that magnetic flux generated by the coils 113 and 114 passes forwardly through the core 111, downwardly through the links 117, pole piece 118, and shoe 119 into the rail, and the relatively long shoe 119 tends to introduce the flux into the rail in such a manner that the flux is well distributed as it laterally enters the rail, thus avoiding the formation of undesirable magnetic spots on the surface of the rail. The relatively long core 111 with its rearward extension 120 tends to fan out the application of magnetic flux to the rail by this magnet.

The second magnet is shown in Figs. 23 and 24 and it comprises a core 121 supported from the car by non-magnetic brackets 122 and having a forward extension 123 which carries a pole piece 124, which may be adjustably positioned by a pin and slot arrangement 125 for height. A cast iron shoe 126 is detachably secured to the bottom of the pole piece 124, but since the pole piece is normally held out of contact with the rail the shoe 126 may be omitted if desired. However, it is preferred that the base 127 of the pole piece 124 have a width at least equal to and preferably greater than the width of the rail head, so that adequate coverage of the rail is assured, even when the car is rounding a curve.

The core 121 carries magnet coils 128 and 129, and these coils produce a magnetomotive force which sends flux forwardly through the core 121 and downwardly through the pole 124 into the rail.

The third magnet is shown in Figs. 25 and 26, and it is similar to magnet 105, having coils 130 and 131 mounted on a horizontal core 132 supported by non-magnetic brackets 133 from the front portion of the trailer section 102. The forward extension 134 of the core accommodates links 135, to the bottom of which are pivotally attached a pole piece 136, which carries a detachable manganese steel shoe 137. The flux produced by the coils 130 and 131 passes forwardly through the core 132, and then downwardly through the links 135 and pole piece 136, all of which are of magnetic material, to the rail, and the manganese shoe 137, being non-magnetic, avoids a concentration of flux that might produce undesirable magnetic poles in the rail. The coils 130 and 131 are held in proper spaced relation by a block 138, suitably secured to the core 132.

The above described arrangement and design of magnets has been found to produce the best results, and, strangely enough, these results, which are superior to those obtained with the arrangement of two magnets shown in Fig. 1, are achieved with less power.

By way of specific illustration, the core 111 preferably has a cross-sectional area of approximately twelve square inches, while the cores 121 and 132 have a cross-sectional area of six square inches. The shoes 119 and 126, associated with the magnets 105 and 106 respectively, are preferably twelve inches long, four inches wide and three-quarters of an inch thick, while the shoe 137, associated with the magnet 107, is preferably six inches long, four inches wide and three-quarters of an inch thick. The coils 113 and 114 may each have 14,630 ampere turns; the coils 128 and 129 may each have 10,450 ampere turns; and the coils 130 and 131 may each have 10,450 ampere turns.

A possible reason for the improved results obtained by the arrangement of magnets shown in Figs. 18 et seq. may best be explained by referring to Fig. 19, which diagrammatically shows a comparison between the apparent direction and strength of magnetic flux along the rail when all magnets are energized and the car is standing still as compared with the situation remaining if the magnets are deenergized. The dotted line curve represents the flux pattern obtained with the arrangement of magnets shown in Fig. 1, while the full line curve shows the flux pattern obtained with the arrangement and design of magnets shown in Fig. 18. It will be noted, for example, that the dotted line curve A dips to a lower value 139 than the corresponding value 140 for the full line curve B, which means that the reversed or forward flux preceding the front magnet is greater with the arrangement shown in Fig. 1 than with the arrangement shown in Fig. 18. Likewise, the crest 141 of rearwardly directed flux for the front magnet in Fig. 1 is higher than the corresponding crest 142 for the magnet 105. It has been found in practice that, when the rearwardly directed flux from the first magnet reached a value as high as that represented by the crest 141, there was a tendency to magnetize the tie plates, thus causing false indications in the flaw detection record. By lengthening the core of the first magnet and by employing two coils spaced apart, the lower crest 142 was obtained, avoiding this difficulty.

The reversed or decreased flux indicated by the loops 143 and 144 on curves A and B, respectively, is intensified when the next magnet comes along, producing a low point 145 for curve A and a low point 146 for curve B. Since reversed flux is undesirable, because it tends to demagnetize the fissures which are being polarized for detection by the induction coil in the detector 109, the lower apparent reversal obtained by the magnet 106 furnishes another advantage over the arrangement shown in Fig. 1. Likewise, the lower peak 147 of curve B, as compared with the peak 148 of curve A, indicates that the magnet 106 has a controlled value that is more favorable to flaw detection than the flux pattern produced by the second magnet in the embodiment of the invention shown in Fig. 1.

Obviously, the greater the extent of the last reversal, the more harmful the reversal of flux is to the polarization of the fissure faces, and hence the peak reversal flux 149 of curve A is less favorable than the corresponding value indicated at 150 for curve B.

It has been found that, by using a third magnet, such as magnet 107, and mounting it in advance of the front wheels 108 of the trailer car, not only may the rail be further energized in a rearward direction, as indicated by the peak 151, but more important than that is the fact that the reversal flux indicated at 152 is exceedingly small. One reason for this is that the magnet 107 is spaced a substantially greater distance from the next preceding wheel 104 than the magnet 106 is spaced from the next preceding wheel 103, with the result that the leakage flux extending forwardly from the pole 136 of the magnet 107 is exceedingly small. This value may be further kept to a minimum by employing a non-magnetic coupler 153 joining the two car sections, so that the car underframes cannot provide a path for the reversal leakage flux.

The desired gradual fanning out of the rearwardly extending field from the magnet 107 as the field leaves the rail may be further enhanced by having the front wheels 108 of the trailer section 102 made of non-magnetic material such as manganese steel. This may be accomplished by mounting the wheel on a cast iron hub 154 which fits over the axle 155, and the wheel 108 cannot then form a part of a magnetic circuit which would shorten the area over which the rearwardly extending flux leaves the rail. Preferably, the rear wheels 110 are made of magnetic material, so that they will constitute a shield for the detector unit 109 from this rearwardly extending flux from the magnet 107.

Even when non-magnetic wheels 108 are employed, it has been found that slight flat spots in the wheel will impose a magnetic spot in the rail each time the flat spot strikes the rail. When the wheel is ground to perfect roundness, the magnetic spot disappears, indicating that the pounding of the rail by the flat spot tends to set a magnetic flux in the rail and thereby cause a false indication. This difficulty may be effectively overcome by employing a resilient or cushioned tread 156 for the wheel 108. As shown in Fig. 20, this tread may consist of a hard rubber tire, or, if desired, a pneumatic rubber tire of appropriate shape may be used instead.

It may be desirable, in some instances, to use non-magnetic wheels at the rear of the second car 102 and preferably such wheels would be equipped with a resilient or cushioned tread 156.

The electromagnet 107, in a sense, serves as a cleaner magnet, removing some of the magnetic spots that may have been introduced into the rail surface by the preceding electromagnets 105 and 106. Experience thus far has indicated that the electromagnet 107 should be so designed that the flux, which it introduces into the rail, should be substantially less than the corresponding flux introduced by the preceding magnet.

It is believed that the above, taken in conjunction with the drawings will enable those skilled in the art to practice the method and apparatus which is herein claimed, and many variations will undoubtedly occur to those who practice this invention, all of which are to be construed as within the scope of the appended claims unless the prior art forbids. For example, under appropriate conditions, an alternating current flux or a pulsating direct current flux, of relatively low frequency (approximately 30 cycles or less) may be introduced into the rail in advance of the main magnetizing device or devices to assist in setting up the residual magnetism to be indicated by the detecting apparatus. This feature, and also the broader concept of the use of a D. C. magnet for clean-up purposes, are the subjects of other copending applications.

Although the expression "L-shaped" has been chosen to describe the characteristic shape of the energizing magnet, it should be understood that it is used in the sense that includes any core shape in which the front pole of the magnet is closer to the rail than the rear pole.

We claim:

1. In flaw detecting apparatus, a car, flaw detecting apparatus mounted on the car including a pair of magnets, a magnetically responsive detector, means for mounting the magnets and detector so that when the car moves in a given direction the two magnets successively and substantially independently impress their fields upon the body under test, and are then followed by the detector which locates traces of residual magnetism.

2. In a flaw detecting apparatus for locating flaws in track, a single-unit car adapted to travel along the track and having at least two wheels of magnetic material on one rail, a magnet mounted in advance of the forward wheel, a magnet mounted intermediate the front and rear wheels and a detector mounted on the car in rear of the latter wheel adapted to locate traces of residual magnetism in the rail.

3. In flaw detecting apparatus for locating flaws in track, a single-unit car adapted to travel along the track and having at least two wheels on one rail, a magnet mounted in advance of the forward wheel, an L-shaped magnet mounted intermediate the front and rear wheels, and a detector mounted on the car in rear of the latter wheel adapted to locate traces of residual magnetism in the rail.

4. In flaw detecting apparatus for locating flaws in track, a single-unit car adapted to travel along the track and having at least two wheels on one rail, an L-shaped magnet mounted in advance of the forward wheel, an L-shaped magnet mounted intermediate the front and rear wheels, and a detector mounted on the car in rear of the latter wheel adapted to locate traces of residual magnetism in the rail.

5. The method of detecting flaws in a magnetizable body which consists in laterally introducing into the body a magnetic flux in such a manner that a portion of the flux passes forwardly through the body although the main body of flux passes rearwardly through the body, gradually leaves it, and then laterally introducing into the body a second magnetic flux in which a larger proportion of the second magnetic flux passes rearwardly through the body than is the case with the first magnetic flux, and then testing the body for traces of residual magnetism.

6. Apparatus for detecting flaws in rail comprising a detector car, means mounted on the car for introducing a relatively strong magnetic flux laterally into the rail in such a manner that a portion of the flux passes forwardly through the rail although the main body of flux passes rearwardly through the rail and gradually leaves it, a second car, a detector carried by the second car for indicating residual magnetism in the rail, and a second rail magnetizing device mounted on one of the cars in such a manner that a smaller proportion of the flux from said second magnetizing device passes forwardly through the rail than is the case with the first rail magnetizing means.

7. Apparatus for detecting flaws in rail comprising a detector car, means mounted on the car for introducing a relatively strong magnetic flux laterally into the rail in such a manner that the main body of the magnetic flux passes rearwardly through the rail and gradually leaves it, a second detector car having front and rear wheels, a detector unit mounted on the second car for indicating residual magnetism found in the rail in the vicinity of fissures, and a second rail magnetizing device mounted on the second car in advance of the front wheel thereof, said second rail magnetizing device also being adapted to introduce a relatively strong magnetic flux laterally into the rail in such a manner that the main body of the flux passes rearwardly through the rail and gradually leaves it.

8. In apparatus for detecting flaws in rail, the combination of a detector car having front and rear wheels, rail magnetizing means positioned in advance of the front wheel, and between the front and rear wheels, for introducing magnetic flux laterally into the rail in such a manner that the main body of flux passes rearwardly through the rail and gradually leaves it, a second detector car, a detector unit mounted on the second car adapted to detect traces of residual magnetism left in the rail by said rail magnetizing means, and additional rail magnetizing means mounted at the front of the second detector car.

9. Apparatus for detecting flaws in rail comprising a detector car, rail magnetizing means carried by the car for passing a relatively strong magnetic flux longitudinally through the rail, a second car having front and rear wheels, a detector unit mounted on the second car for locating traces of residual magnetism left in the rail by the rail magnetizing means in the vicinity of fissures, and additional rail magnetizing means mounted on the second car in advance of the front wheels thereof.

10. Apparatus for detecting flaws in rail comprising a detector car, rail magnetizing means carried by the car for passing a relatively strong magnetic flux longitudinally through the rail, a second car having front and rear wheels, a detector unit mounted on the second car for locating traces of residual magnetism left in the rail by the rail magnetizing means in the vicinity of fissures, and additional rail magnetizing means mounted on the second car in advance of the front wheels thereof, said front wheels being made of non-magnetic material.

11. Apparatus for detecting flaws in rail comprising a detector car, rail magnetizing means carried by the car for passing a relatively strong magnetic flux longitudinally through the rail, a second car having front and rear wheels, a detector unit mounted on the second car for locating traces of residual magnetism left in the rail by the rail magnetizing means in the vicinity of fissures, and additional rail magnetizing means mounted on the second car in advance of the front wheels thereof, said front wheels having a cushioned tread.

12. In apparatus for detecting flaws in rail, the combination of a detector car having wheels for supporting the car on the rail, and means mounted in advance of one of said wheels for introducing a relatively strong magnetic flux laterally into the rail in such a manner that the main body of flux passes rearwardly through the rail and gradually leaves it, said one wheel being made of non-magnetic material.

13. In apparatus for detecting flaws in rail, the combination of a detector car having wheels for supporting the car on the rail, and means mounted in advance of one of said wheels for introducing a relatively strong magnetic flux laterally into the rail in such a manner that the main body of flux passes rearwardly through the rail and gradually leaves it, said one wheel having a cushioned tread.

14. Apparatus for detecting flaws in track comprising at least three rail energizing magnets each adapted to progressively introduce a relatively strong magnetic flux laterally into successive portions of the rail in such a manner that the main body of magnetic flux passes rearwardly through the rail and gradually leaves it, whereby characteristic residual magnetic conditions are left in the vicinity of fissures, a detector unit adapted to travel behind said magnets and out of their fields for locating said characteristic magnetic conditions in the vicinity of fissures, and magnetic poles for each magnet, the poles for the first and third magnets normally being supported by the rail and the pole for the second or intermediate magnet being normally spaced from the rail.

15. Apparatus for detecting flaws in track comprising at least three rail energizing magnets each adapted to progressively introduce a relatively strong magnetic flux laterally into successive portions of the rail in such a manner that the main body of magnetic flux passes rearwardly through the rail and gradually leaves it, whereby characteristic residual magnetic conditions are left in the vicinity of fissures, a detector unit adapted to travel behind said magnets and out of their fields for locating said characteristic magnetic conditions in the vicinity of fissures, and magnetic poles for each magnet, the pole for the first magnet including a shoe of magnetic material normally engaging the rail, and the pole for the third magnet including a shoe of non-magnetic material normally engaging the rail.

16. Apparatus for detecting flaws in track comprising a plurality of rail energizing magnets each of which is adapted to progressively introduce a relatively strong magnetic flux laterally into successive portions of the rail in such a manner that the main body of magnetic flux passes rearwardly thorugh the rail and gradually leaves it, whereby characteristic residual magnetic conditions are left in the vicinity of fissures, and a detector unit adapted to travel behind said magnets and out of their fields for locating said characteristic magnetic conditions in the vicinity of fissures, one of said magnets comprising a core having spaced energizing coils thereon.

17. Apparatus for detecting flaws in rail laid in track, a first car adapted to travel along the track, rail energizing means mounted on the car in such a manner that a relatively small proportion of the magnetic flux which it produces passes forwardly through the rail with the major portion of said flux passing rearwardly through the rail and gradually leaving it, a second car having front and rear wheels, means including a non-magnetic coupler for coupling the second car to the first car, a detector unit mounted on the second car behind the rear wheels for detecting the characteristic magnetic conditions left by the rail energizing means in the vicinity of fissures, and additional rail energizing means mounted on the second car in advance of the front wheels thereof, said latter means being adapted to send a greater proportion of its magnetic flux rearwardly through the rail than is the case with the first mentioned rail energizing means.

18. Apparatus for detecting flaws in track comprising at least three rail energizing magnets, each adapted to progressively introduce a relatively strong magnetic flux laterally into successive portions of the rail in such a manner that the main body of magnetic flux passes rearwardly through the rail and gradually leaves it, whereby characteristic residual magnetic conditions are left in the vicinity of fissures, a detector unit adapted to travel behind said magnets and out of their fields for locating said characteristic magnetic conditions in the vicinity of fissures, said second and third magnets being spaced apart a greater distance than the first and second magnets.

19. The method of detecting flaws in a magnetizable body which consists in laterally introducing into the body a magnetic flux in such a manner that a portion of the flux passes forwardly through the body although the main body of flux passes rearwardly through the body and gradually leaves it, then laterally introducing into the body a second magnetic flux of lesser strength and in which a larger proportion of the second magnetic flux passes rearwardly through the body than is the case with the first magnetic flux, and then testing the body for traces of residual magnetism.

20. Apparatus for detecting flaws in rail laid in track, a first car adapted to travel along the track, rail energizing means mounted on the car in such a manner that a relatively small proportion of the magnetic flux which it produces passes forwardly through the rail with the major portion of said flux passing rearwardly through the rail and gradually leaving it, a second car having front and rear wheels, a detector unit mounted on the second car behind the rear wheels for detecting the characteristic magnetic conditions left by the rail energizing means in the vicinity of fissures, and additional rail energizing means mounted in advance of the front wheels of the second car, said latter means being adapted to send a greater proportion of its magnetic flux rearwardly through the rail than is the case with the first mentioned rail energizing means.

21. Apparatus for detecting flaws in rail laid in track, a first car adapted to travel along the track, spaced rail energizing means mounted on the car in such a manner that each causes a relatively small proportion of the magnetic flux which it produces to pass forwardly through the rail with the major portion of the flux passing rearwardly through the rail and gradually leaving it, a second car having front and rear wheels, a detector unit mounted on the second car behind the rear wheels for detecting the magnetic conditions left by the spaced energizing means in the vicinity of fissures, and additional rail energizing means mounted on one of the cars in advance of the front wheels of the second car, said latter means being adapted to send a greater proportion of its magnetic flux rearwardly through the rail than is the case with the spaced rail energizing means.

22. Apparatus for detecting flaws in rail laid in track, a first car adapted to travel along the track, spaced rail energizing means mounted on the car in such a manner that each causes a relatively small proportion of the magnetic flux which it produces to pass forwardly through the rail with the major portion of the flux passing rearwardly through the rail and gradually leaving it, a second car having front and rear wheels, a detector unit mounted on the second car behind the rear wheels for detecting the magnetic conditions left by the spaced energizing means in the vicinity of fissures, and additional rail energizing means mounted on the rear car in advance of the front wheels thereof, said latter means being adapted to send a greater proportion of its magnetic flux rearwardly through the rail than is the case with the spaced rail energizing means.

WALTER C. BARNES.
HENRY W. KEEVIL.

DISCLAIMER 2,317,720.—*Walter C. Barnes*, Lake Bluff, and *Henry W. Keevil*, Highland Park, Ill. METHOD AND APPARATUS FOR DETECTING FLAWS IN MAGNETIZABLE BODIES. Patent dated April 27, 1943. Disclaimer filed November 1, 1943, by the inventors.

Hereby disclaim claim 1 of said patent.

[*Official Gazette November 23, 1943.*]